United States Patent Office 2,884,908
Patented May 5, 1959

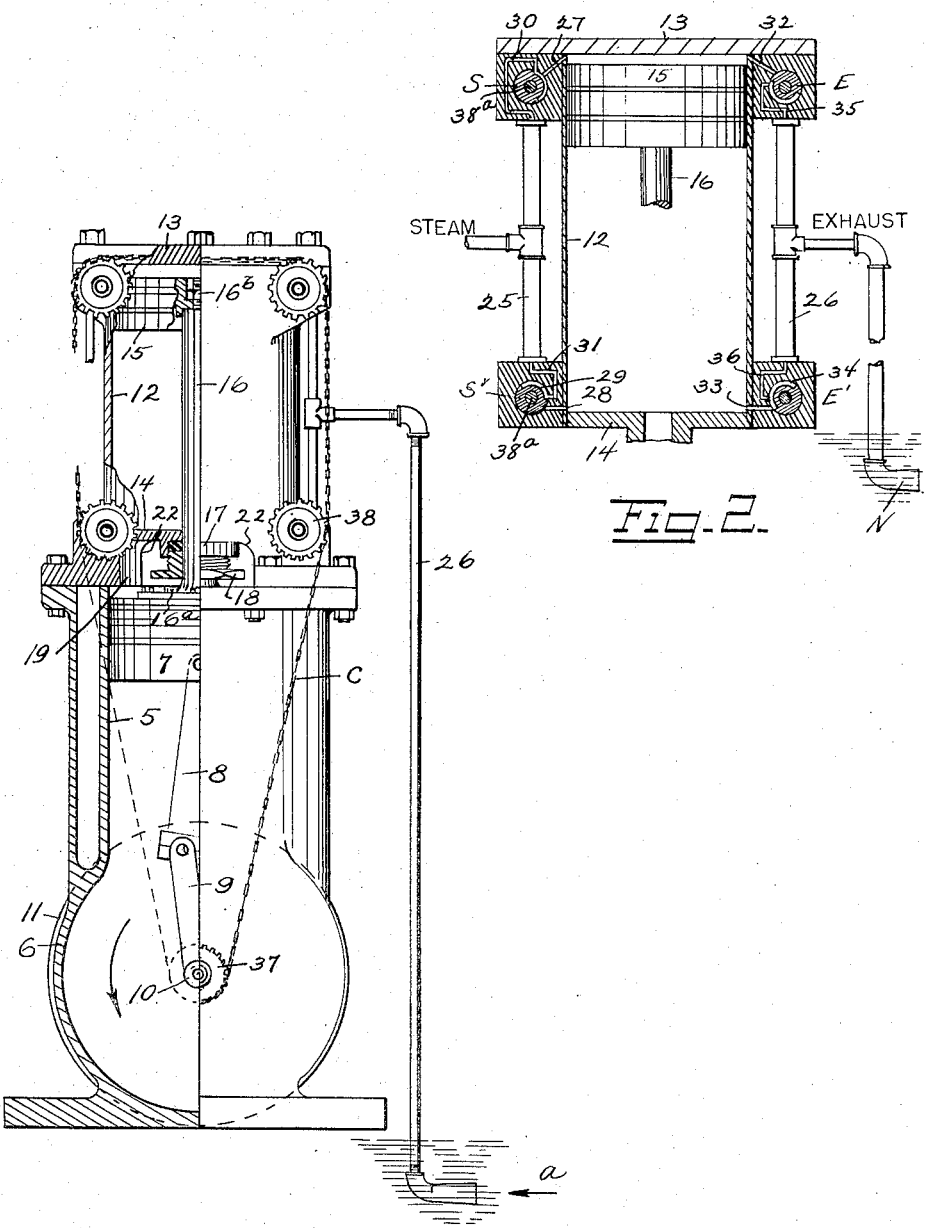

2,884,908

METHOD OF AND MEANS FOR CONVERTING DIESEL INTERNAL COMBUSTION ENGINES TO STEAM ACTUATED ENGINES

Frank G. Campbell, Arlington County, Va.

Application March 30, 1956, Serial No. 575,207

8 Claims. (Cl. 121—179)

This invention relates to a method of and means for converting internal combustion engines and especially engines of the diesel type, to steam actuated mechanisms.

In the early days of power driven ships and boats steam engines were employed as motive power. The diesel engine, with its greater economy in operation and the space saving in fuel storage has supplanted the steam engine in many fields of marine propulsion. With the coming of atomic fuel the problem of converting these diesel powered vessels to steam driven vessels is one of great importance. Up to this time the most practicable way of using atomic fuels for vessel propulsion has been to convert the heat from the fuel to steam and to use the steam power for propulsion, as in the case of the submarine Nautilus recently developed by the United States Navy.

The problem of substituting steam propulsion means for the diesel engine is increased by reason of the fact that the high compression and powerful explosions existent in diesel engines have made it necessary to provide such engines with very heavy and strong cylinders, frames and mountings. To discard these elements would represent a tremendous economic waste. Further many vessels have been designated to receive these very heavy engines and their mountings and to substitute lighter weight steam engines, de novo, would change the trim of the vessel or require a great deal of ballast in compensation for the change in engine weight.

Therefore, it is a primary purpose of this invention to provide a simple and relatively economical means for combining a steam driven element with existent portions of a diesel engine in such fashion that the frame, cylinder block, main shaft, fly wheel, cranks and connecting rods, together with the heavy mountings of a diesel engine may be retained and used as part of the converted structure.

The invention, in its broader aspects, contemplates the removal of the cylinder head of a conventional diesel engine and the mounting over the open end of the diesel cylinder, of a complete steam engine cylinder, steam piston and piston rod. The steam piston rod passes through a conventional stuffing box and the lower end of this steam piston rod is bolted or otherwise secured to the former piston of the diesel engine. This latter piston then no longer serves as a power exerting piston but functions merely as a cross head or guide for the lower end of the steam piston rod.

The invention further contemplates the mounting of suitable steam and exhaust valves upon the steam cylinder so that by the act of placing the steam cylinder in place all necessary valves are automatically brought into proper relation to the complete engine; it being then necessary only to provide any conventional means for actuating the valves from the main shaft of the engine.

In the accompanying drawing, constituting a part of this application, Fig. 1 is a view partly in vertical section and partly in front elevation, of a device showing one embodiment of the invention; and Fig. 2 is a diagrammatic sectional view of one form of valve mechanism which may be employed.

In the drawing 5 designates the cylinder block and 6 the crank case of a conventional diesel engine which it is desired to convert to a steam actuated unit. The diesel piston 7, connecting rod 8, crank 9, main shaft 10 and fly wheel 11 are all preserved and used, only the cylinder head, (not shown) of the diesel unit being removed and discarded.

A steam cylinder 12 having upper head 13 and lower head 14 contains a steam piston 15 and piston rod 16. Piston rod 16 slides through a stuffing box 17 the compression gland of which is indicated at 18. The lower end of piston rod 16 is bolted by bolts 16a or otherwise attached to the diesel piston. The lower portion of the steam cylinder is extended below the lower head 14 to provide a downwardly extending apron 19. A flange 20 of this apron receives the bolts 21 by which the steam cylinder is secured to the top of the diesel cylinder block. An opening 22 formed laterally through apron 19 permits access to the gland 18 of the stuffing box from outside the cylinder.

Any of the well known types of steam and exhaust valves for the steam cylinder, may be employed, such as the conventional Corliss oscillatory type valve for example. Such oscillatory valves are actuated from a rock shaft moved by an eccentric on the engine shaft. They are given a partial rotation to open position and are then pulled sharply to closed position by dash pots. See U.S. Patents 708,750 and 964,194. However, these oscillatory valves I do not employ, but for the purpose of showing a valve structure carried wholly by the steam cylinder and consequently one capable of being assembled with the cylinder at the factory and installed with the cylinder in a single operation, I have chosen rotary valves. There are two steam valves S and S' and two exhaust valves E and E'. (See Fig. 2.) Steam is delivered to the steam valves from the steam line 25 and is conducted from the exhaust valves through an exhaust line 26.

Steam inlet ports 27 and 28 are brought into communication with the steam line when cut out channels 29 of the valves establish communication between said ports and ports 30 and 31 which lead to the steam line.

In like manner exhaust ports 32 and 33 of the steam cylinder are brought into communication with the exhaust line when cut out channels 34 of the exhaust valves move into position to establish communication between ports 32 and 33 and ports 35 and 36 which lead to the exhaust line 26. Rotation may be imparted to all of the valves in unison and at the same rate of speed by a sprocket chain C, said chain being driven from a sprocket 37 on main shaft 10 and which chain passes over sprocket wheels 38 on the shafts 38a of the rotary valves. It is usual in steam engine practice to have the steam valves remain open through only a a portion of the piston power stroke and this I may accomplish by making the channels 29 of the proper length. However, since the cutting off of the steam at an intermediate point in the power stroke has heretofore been dictated largely by motives of economy in fuel consumption this feature is not of so much importance in the present case where such a tremendous amount of heat is derivable from atomic fuel. I may therefore prefer not to cut off the steam as soon as has heretofore been the practice but may prefer to discharge the exhaust at correspondingly greater pressures and utilize the so discharged steam to aid in the propulsion of water craft through jet propulsion. To indicate that this may be done I have shown the exhaust line as leading to an underwater, rearwardly directed discharge nozzle N which functions as a muffler and as a jet propulsion element. Here the arrow "a" indicates the direction of movement of the vessel being propelled in a conventional way by the converted engine the shaft 10 of which drives to a propeller in the usual way.

In the drawings the revolution of the main shaft and also of the valves is counter clockwise and the steam piston is just starting its downward power stroke, in Fig. 1. The point at which the exhaust valves will cut off may likewise be determined by the length of the channels 34 of the exhaust valves. It is common practice to cut off exhaust valves a little before the piston reaches the end of the cylinder whereby to trap enough steam in the cylinder to cushion the piston at the end of its stroke.

The steam piston rod 16 is detachably secured at its upper end to steam piston 15 by a large nut 16b that is accessible from the top of the steam cylinder when the upper head of said cylinder is removed. This facilitates assembly of the steam cylinder with the cylinder block of the diesel engine. This can be accomplished by first securing the lower end of the steam piston rod to the diesel piston, then placing the steam cylinder in place with its head removed, and then entering the steam piston in the steam cylinder and securing it to its piston rod.

While only a single cylinder engine has been illustrated, multiple cylinder engines may be converted in the same way by extending the shafts 38a to actuate the valves of additional steam cylinders.

I am aware of the fact that convertible diesel and steam engines are not broadly new. However all such devices of which I have knowledge involved the provision of conversion features at the time of manufacture of the engines. I know of none involving the elements herein described adopted to convert a diesel, the conversion of which was not contemplated in the original manufacture of the engine.

The invention includes within its purview whatever changes fairly fall within either the terms or the spirit of the appended claims since the principle of mounting a steam cylinder upon the open end of a diesel cylinder and utilizing the diesel piston as the cross head for the steam piston may be embodied in many different forms and this is the gist of the invention.

It will be apparent that the advantages inherent in thus utilizing the former diesel piston as a cross head or guide for the steam piston rod and steam piston are present, irrespective of the particular type of valves which may be employed. Any of the types of valves commonly employed in conventional steam engines may be used.

I claim:

1. The herein described method of converting former diesel engines to steam actuated mechanisms which consists of removing the cylinder head of a former diesel engine, mounting a steam cylinder, piston and piston rod over the open end of the former diesel engine cylinder, attaching the steam piston rod directly to the former diesel engine piston and utilizing the latter piston and its cylinder as a cross head and guide in the operation of the steam cylinder, said steam cylinder comprising both upper and lower heads between which the steam piston reciprocates, said lower head separating the interior of the steam cylinder from the interior of the cylinder of the former diesel engine.

2. The combination with the cylinder and piston of a former conventional internal combustion engine, of a steam engine cylinder, piston and piston rod mounted in tandem thereabove and means securing the lower end of the steam piston rod directly to the piston of the former internal combustion engine, whereby in the action of the steam cylinder the piston of the former internal combustion engine serves as a cross head for the steam piston rod, said steam cylinder comprising both upper and lower heads between which the steam piston reciprocates, said lower head separating the interior of the steam cylinder from the interior of the cylinder of the former diesel engine.

3. A structure as recited in claim 2 in combination with steam and exhaust valves for both ends of the steam cylinder and means for actuating the said valves from and in time relation to a moving part of the former internal combustion engine.

4. A structure as recited in claim 2 in combination with a plurality of steam and exhaust valves for the opposite ends of the steam cylinder and means for actuating all of said valves from the main shaft of the former internal combustion engine.

5. A structure as recited in claim 2 wherein the steam cylinder is closed at its lower end, a stuffing box and its packing gland carried by the said closed lower end of the steam cylinder through which the steam piston rod slides and means for permitting lateral access to the packing gland for adjustment of the same while the steam cylinder is in place upon the former internal combustion engine.

6. The combination with the structure of a former diesel engine which has had its cylinder head removed, of a steam cylinder, piston and piston rod disposed in tandem above the open upper end of the former diesel cylinder, said steam cylinder having a closed lower end carrying a stuffing box and its packing gland through which the piston rod passes and supporting means for securing the steam cylinder over the open upper end of the former diesel engine cylinder with the packing gland spaced above the top of the former diesel cylinder and the supporting means having a lateral opening therethrough through which access may be had to the gland of the stuffing box while the steam cylinder is in its mounted relation upon the former diesel cylinder.

7. A structure as recited in claim 6 wherein the said supporting means consists of an apron at the lower end of the steam cylinder which extends far enough below the lower end of the steam cylinder to elevate the stuffing box above the top of the former diesel cylinder, said apron having a lateral opening in its wall through which access may be had to the gland of the stuffing box from the exterior of said cylinder.

8. The combination with the frame, crank, crankshaft, cylinder, piston, and connecting rod of a former diesel engine, said cylinder having its top open, of a steam cylinder having a steam piston therein, heads, forming closed ends for the steam cylinder, a stuffing box and its packing gland carried by the lower head, a steam piston rod passing through said stuffing box, connected at its upper end to the steam piston, and connected at its lower end to the piston of the former diesel engine so that the latter piston and the former diesel cylinder complementally form a guide for the steam piston rod in both directions of its stroke, steam supply and exhaust valves mounted upon and bodily carried by the steam cylinder, means for securing the steam cylinder to the former diesel cylinder in tandem relation thereto and with its lower end spaced above the former diesel cylinder, said supporting means being of a nature to permit lateral access to the packing gland when necessary, and means for driving the said valves from the crank shaft of the former diesel engine.

References Cited in the file of this patent

UNITED STATES PATENTS

| 564,112 | Sheff et al. | July 14, 1896 |
| 1,514,057 | Leroy | Nov. 4, 1924 |
| 1,802,828 | Perrenoud | Apr. 28, 1931 |
| 1,828,657 | Hawthorn et al. | Oct. 20, 1931 |
| 1,852,932 | Lagergren et al. | Apr. 5, 1932 |
| 2,001,577 | Johnson | May 14, 1935 |
| 2,397,130 | Dawson | Mar. 26, 1946 |
| 2,726,646 | Black | Dec. 13, 1953 |

FOREIGN PATENTS

| 331,648 | France | May 1, 1903 |
| 555,651 | Great Britain | Sept. 1, 1943 |